United States Patent [19]

Hegemann et al.

[11] 4,375,439
[45] Mar. 1, 1983

[54] ANNULAR GAP SCRUBBER

[75] Inventors: Karl-Rudolf Hegemann, Essen-Bergerhausen; Helmut Weissert, Bochum-Hiltrop; Albert Brinkmann, Duisburg, all of Fed. Rep. of Germany

[73] Assignee: Gottfried Bischoff Bau Kompl. Gasreinigungs- und Wasserruckkuhlanlagen GmbH & Co. Kommanditgesellschaft, Essen, Fed. Rep. of Germany

[21] Appl. No.: 281,346

[22] Filed: Jul. 8, 1981

[30] Foreign Application Priority Data

Jul. 31, 1980 [DE]  Fed. Rep. of Germany ....... 3029073

[51] Int. Cl.³ ............................................. B01D 47/10
[52] U.S. Cl. .............................. 261/62; 261/DIG. 54; 261/DIG. 56; 55/226
[58] Field of Search ........ 261/62, DIG. 54, DIG. 56; 55/226; 138/45, 46; 251/122–124

[56] References Cited

U.S. PATENT DOCUMENTS

| | | | |
|---|---|---|---|
| 1,637,597 | 8/1927 | Ulrici | 261/DIG. 54 |
| 3,180,360 | 4/1965 | Pavlin | 251/124 |
| 3,517,485 | 6/1970 | Dell'Agnese et al. | 55/226 |
| 3,601,374 | 8/1971 | Wheeler | 261/62 |
| 4,093,434 | 6/1978 | Hausberg et al. | 261/62 |
| 4,114,850 | 9/1978 | Alamprese | 251/122 |
| 4,216,001 | 8/1980 | Brooks et al. | 261/DIG. 54 |
| 4,231,383 | 11/1980 | Eversole et al. | 261/DIG. 56 |

FOREIGN PATENT DOCUMENTS

| | | |
|---|---|---|
| 7627885 | 1/1980 | Fed. Rep. of Germany . |
| 542534 | 2/1977 | U.S.S.R. ............ 55/226 |

*Primary Examiner*—David L. Lacey
*Attorney, Agent, or Firm*—Karl F. Ross

[57] ABSTRACT

An annular gap washer for scrubbing a gas stream with a liquid, especially for the scrubbing of blast furnace gases with water such that the adjustment of the width of the annular gap controls the pressure at the head of the blast furnace, comprises the usual housing or duct with a tapering configuration and a body axially movable in this duct and with a tapering configuration so that the annular gap is formed between this body and the duct wall. According to the invention, the base angles of the body and the duct walls are different such that the gap converges in the direction of flow of the gases, thereby reducing vibrations or oscillation of the body without interfering with scrubbing efficiency.

4 Claims, 2 Drawing Figures

ANNULAR GAP SCRUBBER

CROSS REFERENCE TO RELATED APPLICATION

This application is related to commonly assigned application Ser. No. 198,042 filed October 17, 1980, (now U.S. Pat. No. 4,316,727) and copending herewith and with an application which has matured into U.S. Pat. No. 4,234,335 filed Nov. 18, 1980 and one of a chain of applications ultimately maturing into U.S. patents commonly assigned herewith and naming one or more of the present inventors as patentees. These patents include: U.S. Pat. Nos. 4,218,241 filed Aug. 19, 1980, 4,152,123 filed May 1, 1979, 4,145,193 filed Mar. 20, 1979, 4,123,238 filed Oct. 31, 1978, 4,052,042 filed Oct. 4, 1977, 4,055,331 filed Oct. 25, 1977, and 4,007,025 filed Feb. 8, 1977.

FIELD OF THE INVENTION

Our present invention relates to annular scrubbers and, more particularly, to gas-washing systems in which a gas, e.g. metallurgical or industrial waste gas, is accelerated through an annular gap together with droplets of a scrubbing liquid, e.g. water, to bring about an intensive and intimate contact between the gas and the water whereby dust particles contained in the gas are picked up by the water droplets and ultimately removed from the gas stream.

BACKGROUND OF THE INVENTION

An annular gap scrubber or washer generally comprises a housing or duct forming an elongated passage of tapering cross section, e.g. with an inlet of small cross section, an outlet of larger cross section and a frustoconical section of increasing cross section between the inlet and the outlet, a frustoconical body being mounted in this passage to define an annular gap with the frustoconical section.

This body is axially displaceable so that the width of the annular gap can be adjusted and, upstream of the gap and this body, one or more spray nozzles can be disposed for spraying the scrubbing liquid, usually water, into the dust-entraining gas stream.

The frustoconical portion of the passage is termed a diffusor because, as this term is used in nozzle applications, it diverges in the direction of flow of the gas stream. The inlet passage, outlet passage and diffusor can form the housing of the annular gap washer although they can be constituted by separate ducts opening into another housing.

In general, the diffusor and the body adjustably disposed therein are of circular cross section and various formations can be provided at the leading end of this body for guidance or other purposes.

While annular gap washers are described in the aforementioned patents and application and the literature cited or of record in the files thereof, reference may be had to German utility model No. 76 27 885 which illustrates a typical annular gap scrubber. Characteristic of substantially all of these scrubbers is the fact that over substantially the entire length of the gap, the gap width is constant, i.e. the inner surface of the housing surrounding the central body and defining the gap therewith is geometrically similar to the outer surface of the body.

In some cases, however, it has been suggested that this gap width should increase in the direction of flow of the gas, i.e. that the surfaces defining the gap should diverge from one another in the direction of flow.

The fluid flow through the gap thus is not accelerated although acceleration may occur as the fluid mixture enters the gap.

Where the surface of the body and the juxtaposed surface of the housing wall are geometrically similar, these surfaces may be said to have identical base angles.

The term "base angle" is used here to describe the angle included between the surface and a plane perpendicular to the axis of the scrubber at the largest end of the surface. If, for example, the body is a frustocone, the base angle is the angle between the outer surface of this body and the large base of the frustocone. A corresponding base angle can be assigned to the housing surface. The angle is thus defined between a generatrix of the conical surface and a radius at the point along the surface where this radius is largest within the region over which the gap extends.

This arrangement in which the acceleration of the gas is reduced to zero or less within the gap has been found to be especially advantageous when the annular gap washer is not only a device for the cleaning of a gas stream but simultaneously serves as the control element of a control system for the gas stream, e.g. for the pressure at the head of a pressurized blast furnace as described in the aforementioned patents.

However, when the central body of the annular gap washer is mounted so as to be displaceable in the manner described, mechanical vibrations or oscillations of this body develop which can interfere with the proper function of the scrubber both as a gas washer and as a pressure control element, and can damage the support system for the central body and other parts thereof.

Depending upon how this body is mounted, these vibrations can be quite considerable.

OBJECTS OF THE INVENTION

It is the principal object of the present invention to provide an annular gap scrubber for the purposes described which eliminates the mechanical vibrations and the detrimental effects thereof as described above.

Another object of the invention is to provide an annular gap washer which can also be used as a control element for the head pressure of a pressurized blast furnace, for example, which will function reliably and for long periods while constituting an improvement upon earlier scrubbers.

SUMMARY OF THE INVENTION

These objects and others which will become apparent hereinafter are attained, in accordance with the present invention, in an annular gap scrubber having a gas inlet passage, a gas outlet passage and a diverging wall portion interconnecting these passages and in which a central body of the same geometric cross-sectional shape is provided to define an all-around annular gap between this wall portion and the central body which diverges in the flow direction as well, this body being provided with means for displacing it relative to the wall portion and thereby adjusting the width of this gap.

According to the invention, the diffusor formed by the wall portion has a base angle, as this term has been defined previously, which is greater than that of the central body. In addition, it has been found to be advantageous to so mount the central body that it is at least somewhat yieldable in the radial direction, i.e. is coupled to the gap-adjusting mechanism by means affording radial displacement of the central body.

The latter means can be rubber/metal couplings or any similar structure of a type known to be useful in the machine arts for compensating for movement or dimensional tolerances.

The invention is based upon our surprising discovery that the mechanical vibration of the central body can be obviated entirely with the aforedescribed relationship of the base angles of the divergent wall portion forming the diffusor and the central body, thereby ensuring the progressively narrowing width in the flow direction. Apparently this progressive reduction in the gap width stabilizes the position of the central body by forming high pressure cushions at the narrowest portion or by a fluid dynamic phenomenon resulting from acceleration of the gas flow through the narrowest portion.

The stabilization results, especially when the aforementioned radial mobility is provided, in an automatic practically coaxial positioning of the body centrally within the housing portion so that the axis of the diffusor practically coincides with the axis of the central body.

Both the central body and the diffusor can be frustoconical as noted previously. Even if the mounting tolerances result in an offset between the original axis of the central body and the axis of the frustoconical housing portion the all-around convergence in the direction of gas flow appears to provide an automatic shifting of the central body and centering thereof as well as a stable retention of the central body in the frustoconical housing portion.

The diffusor cone can be connected directly to an inlet passage, i.e. can be joined to the inlet passage without being preceded by a constricting passage-forming member. A similar effect can be obtained when the diffusor cone is connected directly, i.e. without constriction or stepping, to the outlet passage.

When the annular gap scrubber is intended not only to have the washing function but also to act as a control member in a control circuit for the gas stream, the base angles of the diffusor cone and the conical surface of the central body are so selected with respect to one another that an acceleration of zero or close to zero results. The annular gap scrubber can thus also function as a valve which can close the annular gap entirely by an appropriate axial displacement of the central body.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
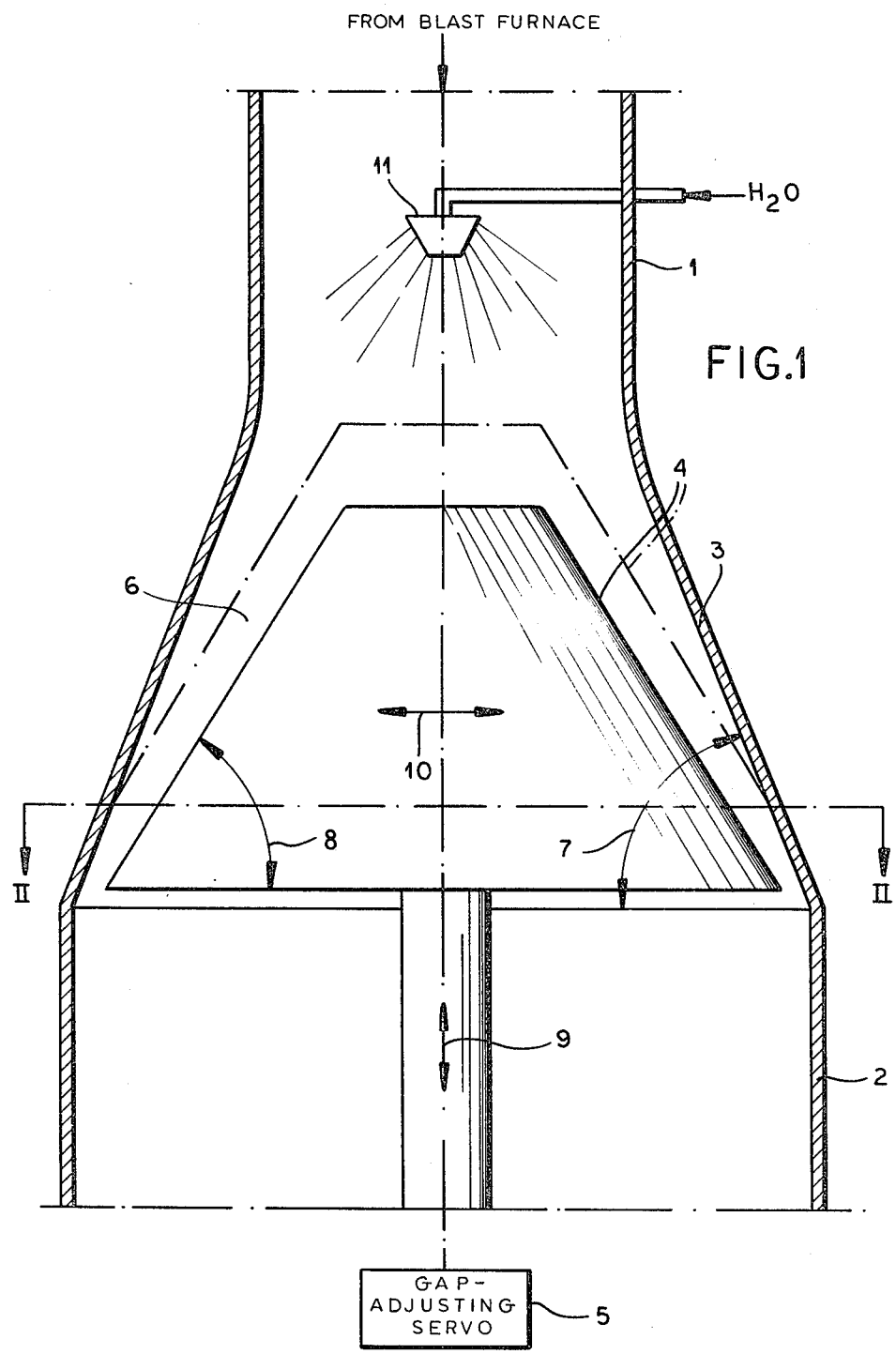
FIG. 1 is an axial section through an annular gap scrubber in accordance with the present invention.

The annular gap washer shown in the drawing comprises a circular section inlet passage 1 of uniform cross section, a circular-cross section outlet passage 2 whose flow cross section is greater than that of passage 1, and a diffusor cone 3 interconnecting these passages and diverging in the direction of flow of the gas.

Within the diffusor cone 3, a frustoconical central body 4 is provided with all-around clearance. This frustoconical body 4 is displaceable as represented by the arrow 9 by a gap-adjusting servo 5. The body defines with the diffusor cone 3 an annular gap 6.

The diffusor cone has a conical base angle 7 which is greater than the conical base angle 8 of the central body 4. These base angles are shown at opposite sides in FIG. 1, define a convergence of the gap shown in exaggereated form in the drawing and in the direction of flow of the gas which can be sprayed with water at its upstream side via a nozzle arrangement represented diagrammatically at 11.

Figure 2:
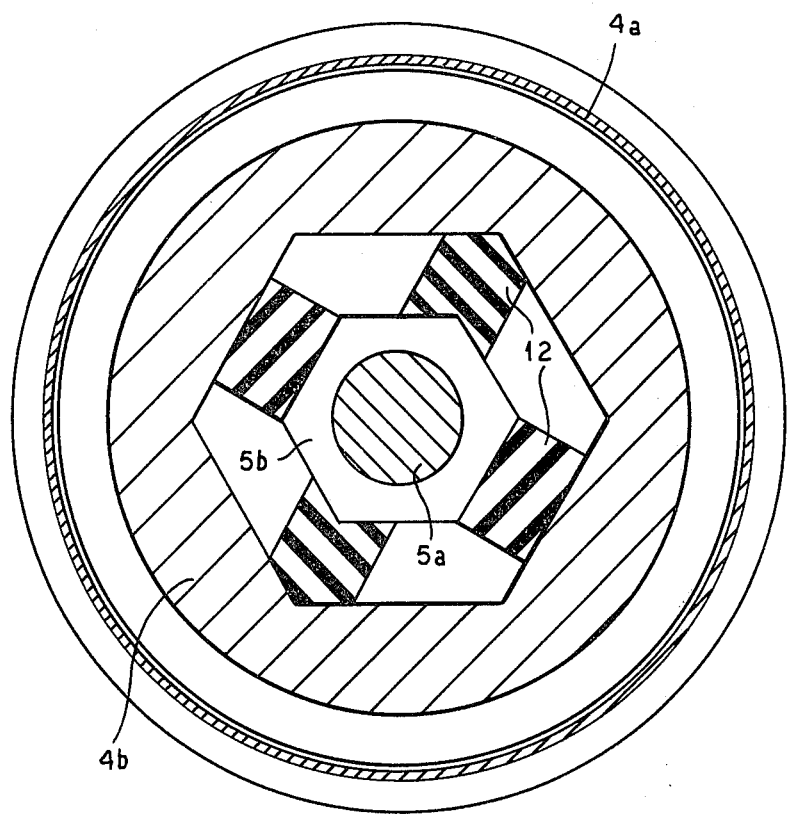
FIG. 2 is a view taken generally along the line II—II thereof.

The body 4 is displaceable in the axial direction as represented by the arrow 9 and can be mounted, e.g. as shown in FIG. 2, on the shaft 5a by metal/rubber suspensions to allow radial mobility as represented by the arrow 10 in FIG. 1.

More specifically, the shell 4a forming the central body, can be provided with a metal member 4b juxtaposed with a metal member 5b on the shaft, these two members being vulcanized to opposite sides of elastomeric (rubber) cushions 12.

FIG. 1 also demonstrates that the diffusor cone is connected directly, without intervening members, to the inlet passage or duct 1 and that the outlet passage 2 is similarly connected directly to the diffusor cone. As represented by dot-dash lines in FIG. 1, moreover, the central body 4 can be displaced until it engages the diffusor cone 3 and thereby completely closes the gap 6. The inlet is connected to the blast furnace as indicated in FIG. 1.

We claim:

1. An annular-gap scrubber comprising:
   a gas inlet passage provided with means for contacting a gas with a scrubbing liquid;
   a gas outlet passage aligned with but spaced from said inlet passage;
   a diffusor cone communicating between said inlet passage and said outlet passage and diverging toward said outlet passage;
   a central body disposed in said diffusor cone and normally spaced by an all-around clearance therefrom, said diffusor cone having a conical base angle which is greater than that of said central body;
   control means connected with said central body for displacing it axially in said diffusor cone; and
   a shaft carrying said central body and resilient means between said central body and said shaft for yielding radially and self-centering said body in said diffusor cone.

2. The scrubber defined in claim 1 wherein said diffusor cone is connected directly to said inlet passage.

3. The scrubber defined in claim 1 wherein said outlet passage is connected directly to said diffusor cone.

4. The scrubber defined in claim 1 wherein said body is displaceable into engagement with said diffusor cone and is constructed and arranged to completely block flow therethrough.

* * * * *